(12) United States Patent
Reynolds et al.

(10) Patent No.: US 6,204,476 B1
(45) Date of Patent: Mar. 20, 2001

(54) WELDING POWER SUPPLY FOR PULSED SPRAY WELDING

(75) Inventors: Jon O. Reynolds; Todd E. Holverson; Albert M. Nowak, all of Appleton, WI (US)

(73) Assignee: Illinois Tool Works, Glenview, IL (US)

( * ) Notice: Subject to any disclaimer, the term of this patent is extended or adjusted under 35 U.S.C. 154(b) by 0 days.

(21) Appl. No.: 09/310,429

(22) Filed: May 12, 1999

(51) Int. Cl.$^7$ ....................................... B23K 9/09
(52) U.S. Cl. ........................................ 219/130.51
(58) Field of Search .................. 219/130.51, 130.21, 219/130.31, 130.32, 130.33, 137.71, 137 PS

(56) References Cited

U.S. PATENT DOCUMENTS

| | | | |
|---|---|---|---|
| 3,071,680 | 1/1963 | Anderson et al. | 219/131 |
| 3,249,735 | * 5/1966 | Needham | 219/130.51 |
| 3,444,430 | * 5/1969 | Needham | 219/130.51 |
| 3,510,676 | 5/1970 | Pierce, Jr. | 307/108 |
| 3,528,100 | * 9/1970 | Budy | 219/130.51 |
| 3,530,359 | 9/1970 | Grist | 321/5 |
| 3,588,465 | * 6/1971 | Anderson et al. | 219/130.51 |
| 3,588,466 | * 6/1971 | Daggett | 219/137 PS |
| 3,775,585 | 11/1973 | Okada | 219/131 |
| 3,890,557 | 6/1975 | Bogdanov et al. | 321/16 |
| 4,384,188 | 5/1983 | Wright, Jr. | 219/130.51 |
| 4,409,465 | 10/1983 | Yamamoto et al. | 219/137 |
| 4,475,028 | 10/1984 | McGuire, Jr. et al. | 219/130.51 |
| 4,594,498 | * 6/1986 | Ueguri et al. | 219/130.51 |
| 4,628,181 | 12/1986 | Pan et al. | 219/130.33 |
| 4,686,350 | 8/1987 | Bodewig | 219/130.51 |
| 4,897,522 | 1/1990 | Bilczo et al. | 219/130.32 |
| 4,897,773 | 1/1990 | Bilczo | 363/56 |
| 5,473,139 | 12/1995 | Matsui et al. | 219/130.51 |

OTHER PUBLICATIONS

Airco Welding Products, Instructions for Aircomatic Welding Machine Pulsed–Arc Model PA–3, Feb. 1969, 2 cover pages, pp. 1–6 and 11–17, back cover.
Airco, Instructions for Aircomatic Welding Machine Model PA–3A Pulsed–Arc, Oct. 1978, 2 cover pages, pp. 1–24, back cover.
Airco, Instructions for Aircomatic Pulsed Air Welding Machine Model PA–3, Jan. 1973, Catalog 1340, Section C pages 2.16.1–2.16.6.

* cited by examiner

Primary Examiner—Clifford C. Shaw
(74) Attorney, Agent, or Firm—Foley & Lardner

(57) ABSTRACT

An arc welding machine is disclosed for providing a continuous feed electrode to a weld site. The arc welding machine includes a line frequency transformer having a primary winding, a first secondary winding, and a second secondary winding (e.g., an extension winding, a separate winding, etc.). The first secondary winding provides a welding power having a first voltage at a welding power output terminal. The second secondary winding provides a second welding power having a second higher voltage at an input terminal of a switch, the switch being controlled to provide a pulsed power at the welding power output terminal. According to one feature, the arc welding machine produces a pulsed power having a fixed pulse width and a fixed frequency, the fixed pulse width and fixed frequency being substantially free of operator adjustment.

46 Claims, 11 Drawing Sheets

WELDING POWER SUPPLY FOR PULSED SPRAY WELDING

FIELD OF THE INVENTION

The present invention relates generally to welding power supplies and, more specifically, to welding power supplies for providing a pulsed spray transfer welding technique.

BACKGROUND OF THE INVENTION

Many methods of welding are known in the art, each with its own advantages and disadvantages. Common welding processes include gas welding, oxyacetylene brazing and soldering, shielded metal arc welding (SMAW) or "STICK" welding, metal inert gas (MIG) or "wire feed" welding, and gas tungsten arc welding (GTAW) or "TIG32" welding. MIG welding is notable for its simplicity and speed. Although the apparatus of the present invention is described with reference to a MIG welding power supply, one skilled in the art will appreciate that the present invention may have applications in many other welding power supplies.

MIG welding power supplies may operate in a short circuit transfer technique, a pulsed spray transfer technique, or a continuous spray transfer technique. In short circuit transfer, filler wire is automatically fed from the power supply to a welding site. A welding current is applied to the filler wire which generates a welding arc between the filler wire, acting as an electrode, and a workpiece. As the operator draws the electrode along the workpiece at a welding site, the filler wire creates a short circuit with the workpiece, releases a drop of filler wire thereby opening the circuit, and, subsequently, the filler wire is advanced to create another short circuit. Thus, the filler wire and the workpiece make a series of short circuit contacts as filler wire is applied to the workpiece. One disadvantage of the short circuit welding process on aluminum material is that the weld is porous (i.e., has a poor diffusion quality). On steel, short circuit welding works well and is an accepted standard method, but it should not be used on aluminum material due to the lack of fusion of the weld. Furthermore, the porosity of the short circuit transfer weld on aluminum causes a weaker weld. During short circuit welding, the arc gives off a characteristic, audible "sizzle" sound.

In a pulsed spray transfer welding technique, the filler wire does not create a short circuit with the workpiece. This is accomplished by the welding device creating a pulsed welding current, including a first lower welding current and a second higher welding current (and perhaps additional current levels). Because the pulsed spray operates at these different current levels, the filler wire creates a weld puddle that is allowed to freeze slightly between pulses. Also, the average current is maintained lower than that of continuous spray, while the peak amperage of the pulse is great enough to create an axially-stable arc. These features provide for better control of welding of thin metals. Preferably, at least one of the first lower welding current and second higher welding current is applied above a transition current of the filler wire. The transition current of the filler wire is the current at which the welding arc provides a sufficient magnetic field to direct the molten filler wire in the direction of the workpiece. This creates an axially-stable welding arc, since the magnetic field of the arc is capable of directing molten filler wire in all positions on the workpiece, including positions reachable only against the direction of gravity. Continuous spray welding does not require a pulsed welding current, but takes place at higher currents than does the short circuit transfer technique.

Many low-cost MIG welding power supplies only allow for short-circuit transfer or continuous spray transfer. Most power supplies which allow for pulsed spray transfer are significantly more expensive (e.g., inverter-based power supplies), in part because these power supplies also allow for operator control over the various characteristics of the welding pulse (e.g., pulse width, pulse frequency, pulse amplitude, etc.). Accordingly, the prior art fails to disclose a welding device capable of pulsed spray transfer to achieve a high-quality weld with a low welding current in a low-cost and easy to use welding device. Recently, the Aluminum Association has promoted the pulsed welding method for aluminum; however, a suitable low-cost and easy to use pulsed spray welding power supply is unavailable.

Since the Aluminum Association has endorsed pulsed spray welding for welding light-gage aluminum and other metals, less experienced welders are likely to find a need for a suitable low-cost welding device. Presently available pulsed spray welding devices contain a plurality of adjustment knobs, which allow an unskilled operator to select invalid or undesirable pulsed spray welding conditions. Such operators are accustomed to adjusting voltage and wire feed speed in short circuit or continuous spray power supplies, but are less familiar with the plurality of settings required for a suitable pulsed spray welding power.

Accordingly, what is needed is a pulsed spray welding device having simplified operator interface controls that are suitable for commonly used types of filler wire in common aluminum or other thin metal welding applications. Further what is needed is a welding power supply that has short circuit transfer, pulsed spray transfer and continuous spray transfer capabilities to allow an operator to utilize the advantages of continuous spray transfer (e.g., for such applications as aluminum or steel welding wherein the thickness of the aluminum or steel is great), pulsed spray transfer for thinner materials, and short-circuit transfer for thinner steel materials. This system also would be low-cost and easy to operate.

SUMMARY OF THE INVENTION

These and other limitations in the prior art have been overcome by the present invention which, according to one embodiment, is an arc welding machine for providing a continuous feed electrode to a weld site. The machine includes a line frequency transformer having a primary winding, a first secondary winding and a second secondary winding. The first secondary winding provides a welding power having a first voltage at a welding power output terminal. The second secondary winding provides a second welding power having a second higher voltage at an input terminal of a switch. The switch is controlled to provide a pulsed power at the welding power output terminal.

According to another exemplary embodiment, an arc welding machine is disclosed for providing a continuous feed electrode to a weld site. The machine includes a line frequency transformer means including first and second secondary windings for receiving a line frequency power and for providing first and second welding powers. The second welding power has a higher voltage than the first welding power. The machine includes a first means for receiving the first welding power and for providing a background welding power at the welding power output. The machine further includes a second means for receiving the second welding power and for providing a pulsed welding power at the welding power output terminal.

According to another exemplary embodiment of the present invention, an arc welding machine is disclosed for providing a continuous feed electrode to a weld site. The machine includes a power circuit to provide a pulsed welding power to the weld site having a fixed frequency and a fixed pulse width, whereby the fixed frequency and fixed pulse width are substantially free of operator adjustment.

According to a further feature of this embodiment, the power circuit also provides the pulsed welding power having a substantially fixed peak current.

According to yet another exemplary embodiment of the present invention, an arc welding machine is disclosed for providing a continuous feed filler wire to a weld site. The machine includes a single-phase AC power source, a rectifier circuit and a switch. The AC power source provides a power signal. The rectifier circuit is coupled to the AC power source and substantially rectifies the power signal. The AC power source provides the rectified power signal with a constant voltage characteristic to the weld site. The switch is coupled to the AC power source and provides a pulsed power signal with a constant current characteristic to the weld site.

According to still another exemplary embodiment of the present invention, a power circuit is disclosed for providing pulsed welding capability to a welding power supply. The welding power supply is the type having a line frequency transformer to provide a first welding power at a welding power output terminal. The power circuit includes a transformer, a switch and a control circuit. The transformer provides a second welding power. The switch is coupled to the transformer to receive the second welding power. The control circuit is coupled to the switch and controls the switch to provide a pulsed welding power at the welding power output terminal. The pulsed welding power has a fixed frequency, fixed peak current, and fixed pulse width. The fixed frequency, fixed peak current, and fixed pulse width are substantially free of operator adjustment.

According to yet another exemplary embodiment of the present invention, a power circuit for an arc welding machine is disclosed for providing a pulsed welding arc based on a line frequency power. The power circuit includes a first power circuit to provide a main welding power to a weld site. The power circuit further includes a second power circuit to provide a pulsed welding power having a fixed pulse width to the weld site. The second power circuit includes a control circuit to adjust the pulse width based on the line frequency power to provide a pulse having a substantially constant current.

BRIEF DESCRIPTION OF THE DRAWINGS

The invention will become more fully understood from the following detailed description, taken in conjunction with the accompanying drawings, wherein like reference numerals refer to like parts, and in which.

DETAILED DESCRIPTION OF THE PREFERRED EMBODIMENTS

Figure 1:
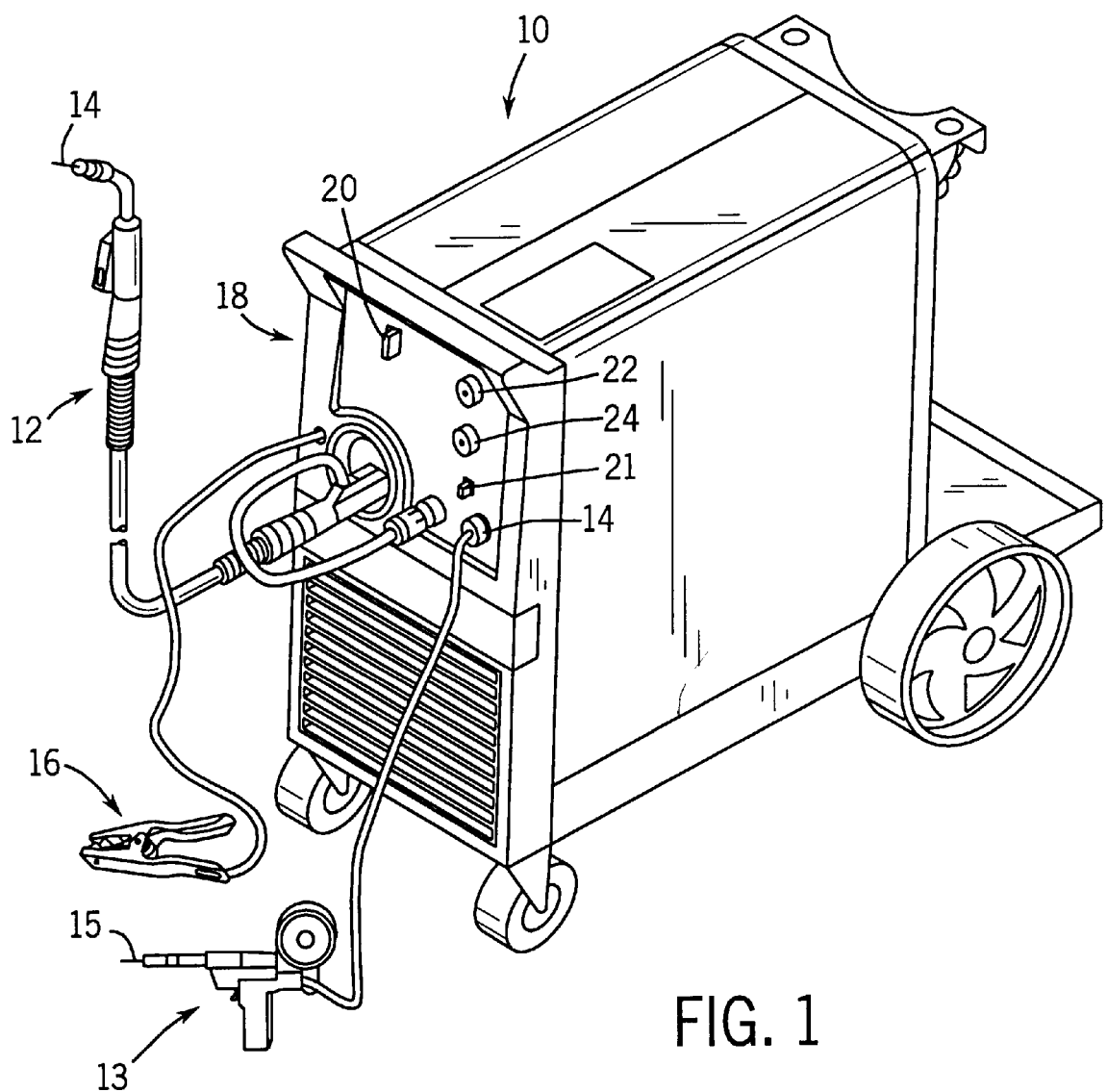
FIG. 1 is a perspective view of an electric arc welder having simplified operator controls according to an exemplary embodiment of the present invention.

Referring first to FIG. 1, an electric arc welder 10 is shown according to an exemplary embodiment of the present invention. Arc welder 10 is a MIG welding device, but may alternatively be other welding devices. Welder 10 includes a gun 12 and a spoolgun 13, each for providing a consumable electrode 14, 15 and a shielding gas (source not shown) to a weld site. Since arc welder 10 is a wire feed power supply, a wire feed mechanism and filler wire supply (not shown) are encased in arc welder 10 for welding with steel filler wire using gun 12. For welding with aluminum filler wire using spoolgun 13, a filler wire spool and wire feed mechanism are provided on spoolgun 13. Spoolgun 13 is coupled to welder 10 at socket 17 and receives welding power therefrom.

During MIG welding, arc welder 10 controls the speed with which filler wire is supplied to a weld site. Consumable electrode 14 is aluminum wire having a diameter of 0.035 inches. Alternatively, 0.030, 0.023, or greater or less than 0.035 inch filler wire may be used. Electrode 14 could alternatively be of any other composition suitable for welding (e.g., aluminum alloy, steel or steel alloy, silicon bronze, aluminum bronze, or other metals). The shielded gas provided may be pure argon gas for aluminum welding, carbon dioxide or carbon dioxide/argon mixed gas for steel welding, or some other shielding gas or shielding gas mixture suitable for aluminum or steel welding. Arc welder 10 further includes a work clamp 16 adapted to provide the electrical connection to a workpiece for arc welder 10. According to one embodiment, arc welder 10 may include a work clamp socket for electrically coupling work clamp 16, a pulsed welding output socket for pulsed welding with an aluminum welding gun, and a steel welding output socket for short circuit welding with a second steel welding gun. In this embodiment, both guns may be coupled simultaneously to arc welder 10 while gas and welding power are only provided to the gun selected by the operator.

Arc welder 10 includes a simple set of operator controls 18 including a pulse on/off selector 20, a voltage selector 22, and a wire feed speed selector 24. Naturally, a welder on/off selector 21 is also provided. Pulse on/off selector 20 allows the operator to switch between a pulsed spray transfer technique and a short circuit transfer technique. Voltage selector 22 allows the operator to select from a range of welding voltages suitable for a range of workpieces. According to one embodiment of the present invention, voltage selector 22 has five positions ranging from a first, low-voltage setting to a fifth, high-voltage setting. In an alternative embodiment, selector 22 may select from within a continuous range of voltages from the low-voltage setting to the high-voltage setting. Wire feed speed selector 24 allows the operator to select a wire feed speed, which determines the speed with which consumable electrode 14 is provided to a weld site.

According to one advantageous feature of the present invention, operator controls 18 are few in number (e.g., approximately three), and do not allow the operator substantial control over the characteristics of the pulse (e.g., frequency, peak amplitude, pulse width, etc.) in the pulsed spray transfer technique. Thus, pulse frequency, peak amplitude, pulse width, and/or other pulse characteristics are fixed. Accordingly, these controls are adapted for operators with less welding experience as well as those with more welding experience. Arc welder 10 advantageously provides a pulsed welding current in a pulsed spray transfer technique which has characteristics suitable for relatively low current welding applications.

Figure 2:
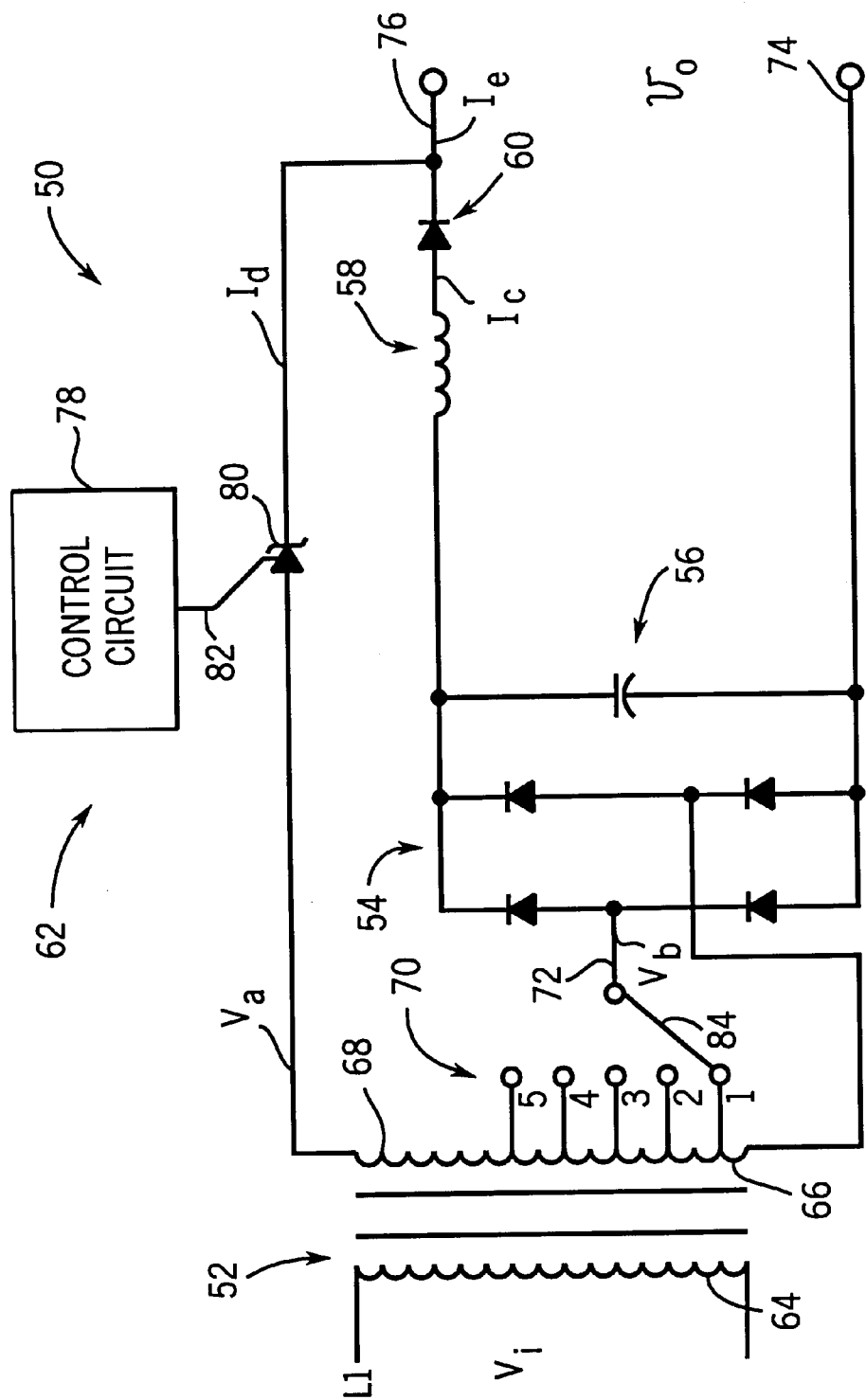
FIG. 2 is a circuit for selectively providing welding current in a pulsed spray welding technique or a short circuit welding technique according to an exemplary embodiment of the present invention.

Referring now to FIG. 2, a power supply circuit 50 according to an exemplary embodiment of the present invention will be described. Power supply circuit 50 includes a transformer 52, a rectifier circuit 54, a capacitor 56, an inductor 58, a diode 60 and a controlled switch 62. Transformer 52 includes a primary winding 64 for receiving a line frequency power, a first secondary winding 66, and a second secondary winding 68. First secondary winding 66 provides a first voltage to a line 72. In this embodiment, first secondary winding 66 includes a plurality of taps 70 (e.g., a multi-tap transformer) numbered 1 through 5 for providing one of a plurality of welding power outputs to line 72 at a plurality of respective voltages. Second secondary winding 68 provides a second welding power having a second voltage higher than the first voltage. In this embodiment second secondary winding 68 is an extension winding, but may alternatively be a separate winding or other source. An extension winding is a winding coupled to first secondary winding 66, while a separate winding is a winding deriving power from primary winding 64 which is not directly coupled to first secondary winding 66. In a preferred embodiment, second secondary winding 68 is an extension winding having a thinner gauge wire than that of first secondary winding 66.

Line 72 feeds a welding power to a rectifier circuit 54 which is a full-wave bridge rectifier, but may alternatively be other types of rectifier circuits (e.g., half-wave rectifier, diode, etc.). Rectifier 54 is coupled to capacitor 56, which is an electrolytic capacitor, but may alternatively be another type of capacitor. One terminal of capacitor 56 serves as a welding work terminal 74 which is coupled to clamp 16. The other terminal of capacitor 56 is coupled in series through inductor 58 and diode 60 to a welding power terminal 76 which provides power to electrode 14.

Controlled switch 62 includes a control circuit 78 and a switch 80. The control circuit may be a microprocessor (e.g., a Motorola or Intel microprocessor or microcontroller) or discrete-component control circuit to provide a control signal along line 82 to switch 80. Switch 80 is preferably a silicon controlled rectifier (SCR), but may alternatively be an insulated gate bipolar transistor (IGBT), or other switching device.

Control circuit 78 receives control signals from simple operator controls 18. In response to a pulse on/off selector signal from pulse on/off selector 20, control circuit 78 selectively provides the control signal on line 82 to switch 80. Wire feed speed selector 24 provides a wire feed speed signal to control circuit 78 or to a second control circuit which controls the speed with which consumable electrode 14 is fed to the welding site. Voltage selector 22 is coupled to a switch 84 to control which of taps 70 is coupled to line 72, thereby controlling the magnitude of the voltage applied to consumable electrode 14.

In operation, power supply circuit 50 generates a main welding power and a pulsed welding power at welding power terminal 76. For aluminum workpieces up to approximately one-eighth inch thickness, a pulsed spray welding technique is preferable. For welding thicknesses of approximately three-eighths inch or greater for aluminum, and steel, a continuous spray welding technique is preferable. Power supply circuit 50 provides a single-phase welding power with a relatively low current (e.g., approximately 225 Amps average current) in the following manner. A line frequency power enters the circuit at primary winding 64. First secondary winding 66 is part of a multi-tap transformer. Notably, power supply circuit 50 includes a single transformer for both main welding power and pulsed welding power, thereby greatly reducing the cost of having multiple transformers (e.g., one for the main welding power and one for the pulsed welding power). The addition of extension winding 68 and the elimination of a second transformer both contribute to this significant reduction in cost.

The operator adjusts switch 84 to select one of taps 70 to provide a main welding power having a first voltage to line 72. Rectifier 54 receives this main welding power, rectifies the main welding power and provides it to capacitor 56. According to an exemplary embodiment, capacitor 56 includes four 30,000 microFarad ($\mu$F) electrolytic capacitors in parallel (total of 120,000 $\mu$F) rated at 50 VDC at 85 degrees Celsius. A smooth main welding power waveform is provided to inductor 58 which, in one embodiment, is a Stabilizer Z1 output inductor manufactured by Miller Electric Mfg. Co. rated 150 A, 23 V, 60% duty. Inductor 58 buffers the main welding power and provides it through diode 60 to welding power terminal 76. Diode 60 serves to prevent the flow of current from switch 80 back into capacitor 56.

A second welding power is provided by second secondary winding 68 at a voltage higher than that of the first welding power. Pulsed welding power is switched through switch 80 by control circuit 78 at a predetermined frequency. In one embodiment, control circuit 78 pulses switch 80 at a substantially fixed frequency that is a multiple of the line frequency, such as, approximately one-half the line frequency (e.g., 30 Hertz for a 60 Hertz line frequency, 25 Hertz for a 50 Hertz line frequency, etc.), and provides a pulse having a substantially fixed pulse width of approximately 1.75 milliseconds, utilizing approximately 20% of the positive half-cycle of the higher-voltage waveform received from second secondary winding 68 (see FIG. 3 and discussion below). The predetermined frequency may be as low as 24 Hertz, at which point the flicker of the pulse is disturbing to the operator, or as high as 50 Hertz or more, above which the current of the welding power becomes too high for most low-current welding operations. For a consumable electrode made of aluminum having a diameter of 0.035 inches, a pulse width of approximately 1.75 milliseconds and a pulsed welding current having a peak current when added to the main welding power of 250 Amps has been deemed suitable for low current aluminum welding applications. The fixed pulse width of 1.75 milliseconds, fixed pulse peak amperage (for a given load), and fixed frequency contribute to the ease of operation by lesser skilled operators and the adaptability of the power supply for specific welding applications.

The optimal pulse width is determined in part based on the impedance of the transformer. The optimal peak current of the pulse is based in part on the transition current of the filler wire and is selected to be somewhat greater than this transition current, according to an exemplary embodiment. The background or main welding power has an average current less than the transition current of the filler wire, since short circuit welding transfer typically welds below this transition current.

Other factors may affect the optimal pulse width and optimal peak current. For example, the composition of the shielding gas may affect the transition current. If this factor is significant, the peak current of the pulse must be set to ensure that the peak current reaches above the transition current in spite of the effect of various compositions of shielding gasses.

Figure 8:
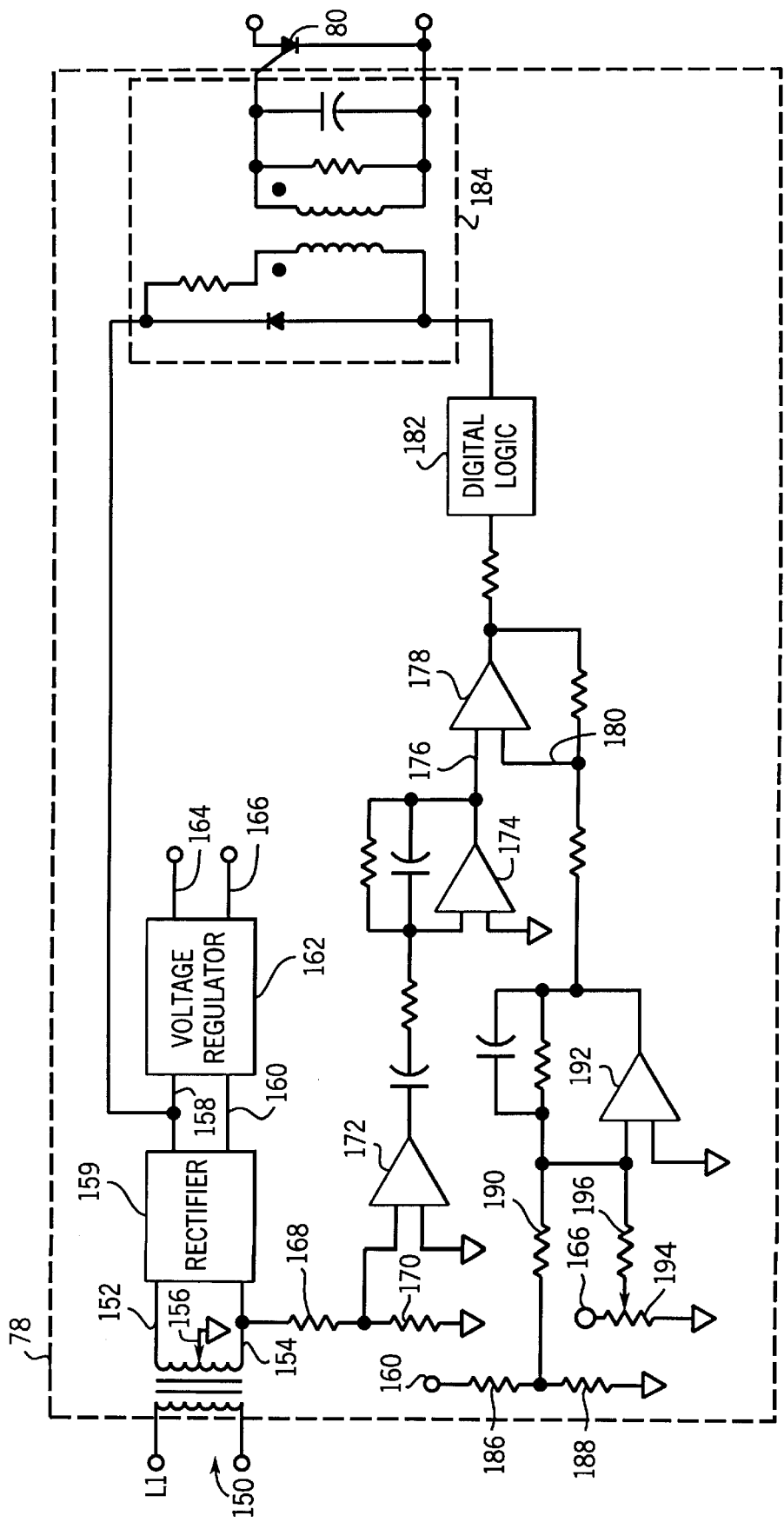
FIG. 8 is a schematic diagram of a control circuit for the circuit of FIG. 2 according to an exemplary embodiment of the present invention.

Also, the voltage of the line frequency power may vary from one location to another, for example, between 205 and 225 Volts. This variance may significantly affect the peak current during pulse welding. Therefore, according to an advantageous feature of the present invention, FIG. 8 discloses one embodiment of control circuit 78 having an improved feature whereby the pulse width of the pulsed welding power is automatically adjusted based on the variance of the line frequency voltage to accommodate for variances in pulse current. As will be understood by one skilled in the art, various circuit embodiments may perform this function. According to this exemplary embodiment, control circuit 78 receives a line frequency power L1 at a transformer 150 having a first terminal 152, a second terminal 154, and a center tap 156. A rectifier 159 is coupled to first and second terminals 152, 154 to provide unregulated, rectified (DC) power at lines 158 and 160. In this exemplary embodiment, line 158 provides a positive 22.5 Volts DC (VDC) and line 160 provides a negative 22.5 VDC. A voltage regulator circuit 162 is coupled to lines 158 and 160 to provide regulated power of, for example, +15 VDC and −15 VDC at terminals 164 and 166, respectively.

An AC voltage waveform from second terminal 154 is scaled by resistors 168 and 170 and is provided to operational amplifier (op amp) 172. Op amp 172 provides a square wave output having a pulse width of approximately 8.3 milliseconds (i.e., one-half of the 60 Hertz frequency of the AC voltage waveform) to op amp 174. Op amp 174 provides a saw-toothed output waveform to a first terminal 176 of comparator 178. A DC command signal is provided at a second terminal 180 of comparator 178. When the saw-toothed signal exceeds the DC command signal, a current pulse is initiated by transmitting a signal through digital logic 182 to a switch firing circuit 184. When the saw-toothed signal falls below the DC command signal, the current pulse ends. In summary, the pulse width of the current pulse provided by switch 80 is determined by the points at which the saw-toothed signal crosses the DC command signal. Thus, if the voltage of the line frequency power L1 increases, the pulse width will increase; if the voltage of the line frequency power L1 decreases, the pulse width will decrease.

Accordingly, the present invention provides a DC command signal which is dependent on the line frequency power. The unregulated DC voltage provided at line 160 is scaled through resistors 186, 188, and 190 to a first terminal of op amp 192. Since this voltage is unregulated, it will increase or decrease based on the line frequency power. Exemplary values for resistors 186, 188 and 190 include two kiloOhms (KΩ) for resistor 186, one KΩ for resistor 188, and 162 KΩ for resistor 190. Op amp 192 provides the unregulated command signal to second terminal 180 of comparator 178. In operation, when the line frequency voltage increases, the pulse width will decrease, and when the line frequency voltage decreases, the pulse width will increase, both operations acting to maintain a constant current pulse welding current provided by switch 80.

As a further improvement, the DC command signal can be "tweaked" or slightly adjusted for welding power supplies having different applications. A potentiometer 194 has a power terminal coupled to one of the voltage regulator terminals, for example, terminal 166. A DC voltage based on the setting of potentiometer 188 is provided through resistor 196 to op amp 192. Exemplary values for potentiometer 194 and resistor 196 include one KΩ for potentiometer 194 and 619 KΩ for resistor 196. During manufacturing, potentiometer 194 can be set to a desired fixed pulse width for a particular welding operation, filler wire thickness, etc. Thus, the fixed pulse width is automatically adjustable based on the line frequency voltage, but not adjustable based on any operator input.

Figure 3:
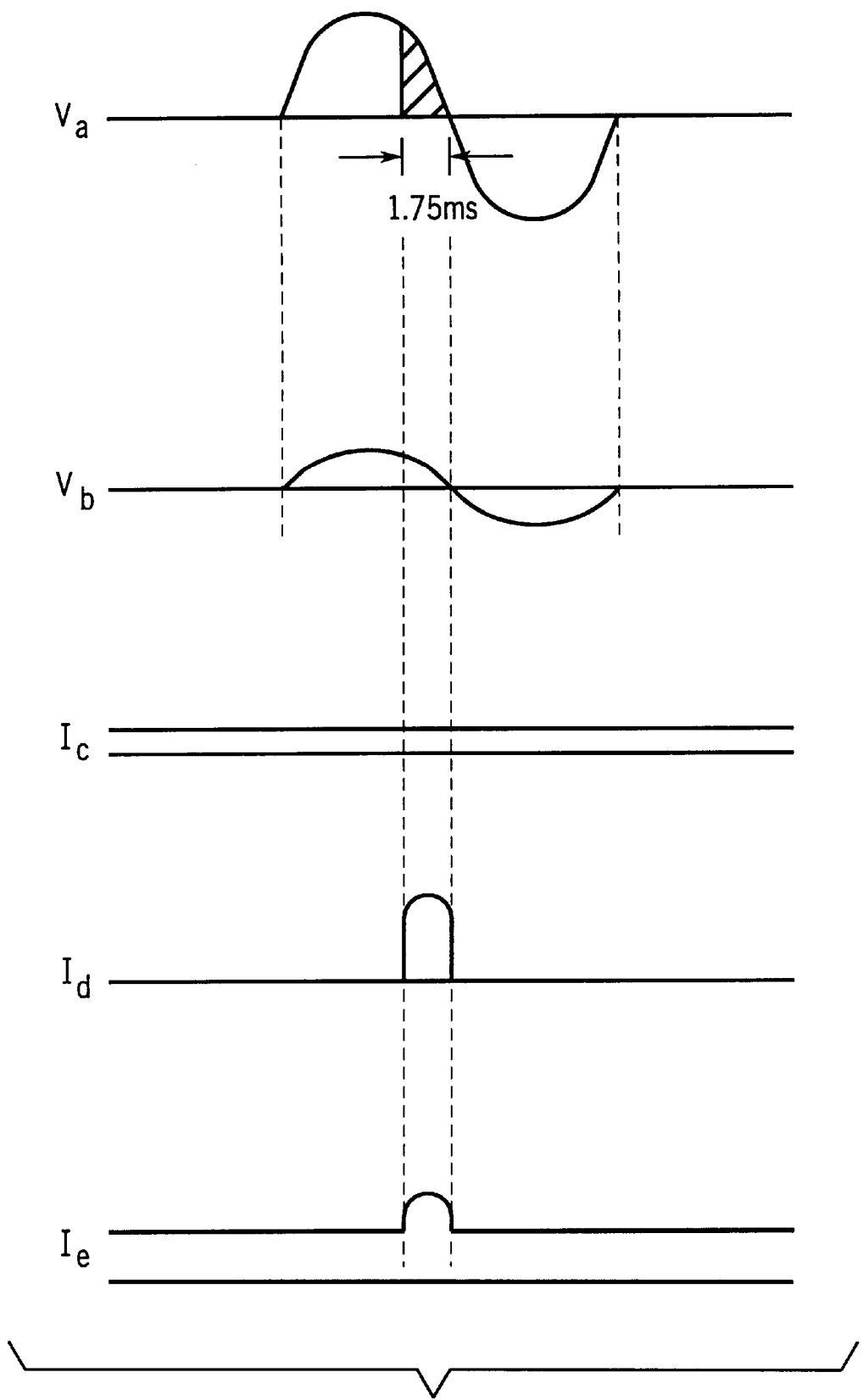
FIG. 3 is a waveform diagram showing voltage and current characteristics at various points in the circuit of FIG. 2.

Referring now to FIG. 3, waveforms for a single cycle of line frequency power at various points in power supply circuit 50 are shown. Va is the higher voltage waveform tapped off the second secondary transformer 68. The waveform indicates in a shaded portion the portion of the waveform which is passed through switch 80 when switch 80 is fired by control circuit 78. This portion amounts to approximately 1.75 milliseconds in pulse duration (i.e., about 2% of the positive half-cycle of the waveform), but may also be between about 1.7 and 1.9 milliseconds according to one low-current embodiment of the present invention. Vb indicates the lower voltage waveform tapped off of first secondary winding 66. Ic represents the main welding power in DC form as rectified by rectifier 54, smoothed by capacitor 56 and buffered by inductor 58. Ic may alternatively have some degree of ripple based on selection of capacitor 56 and inductor 58. Id represents a single pulse of pulsed welding power. Finally, Ie represents a single cycle of welding power, including pulsed welding power plus main welding power, at welding power terminal 76. As mentioned previously, control circuit 78 pulses switch 80 at approximately 30 Hertz. This frequency provides a simple, low-cost pulse, since it is a multiple of the input line frequency power, and further provides a low current pulsed welding power over time relative to higher frequencies, such as, 60 or 120 hertz.

Figure 4:
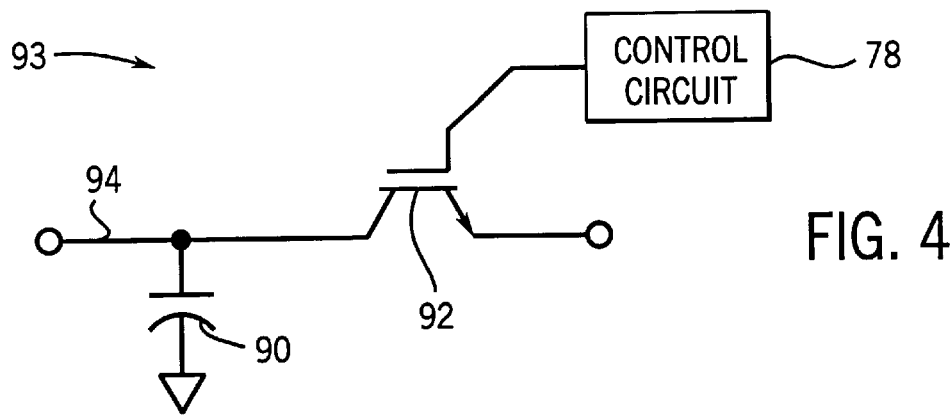
FIG. 4 is a circuit diagram showing an alternative embodiment of the switch of FIG. 2.

Advantageously, the SCR, diode 60, extension winding 68 and control circuit 78 are low-cost elements to further contribute to the simplicity and low-cost nature of the present invention. In one alternative embodiment, a switch 93 comprises a capacitor 90 coupled to an insulated gate bipolar transistor (IGBT) 92 such as that shown in FIG. 4. A power input signal is applied at an input terminal 94 from second secondary winding 68 (see FIG. 2) which may be an extension winding, a separate winding or a higher tap on first secondary winding 66. The power input signal could alternatively be provided by a second transformer, a voltage doubler (e.g., the voltage doubler shown in FIG. 6), or other source of power, though the embodiment including a second transformer may add an undesirable cost element. In this embodiment, IGBT 92 "dumps" capacitor 90 in response to a build-up of charge or in response to an input, such as, a control input from control circuit 78, to create the high-voltage pulse. The IGBT 92 and capacitor 90 combination could be controlled with any frequency, i.e., not just a multiple of the line frequency. However, configurations of this embodiment could be more expensive than the simple version explained hereinbefore.

Figure 5:
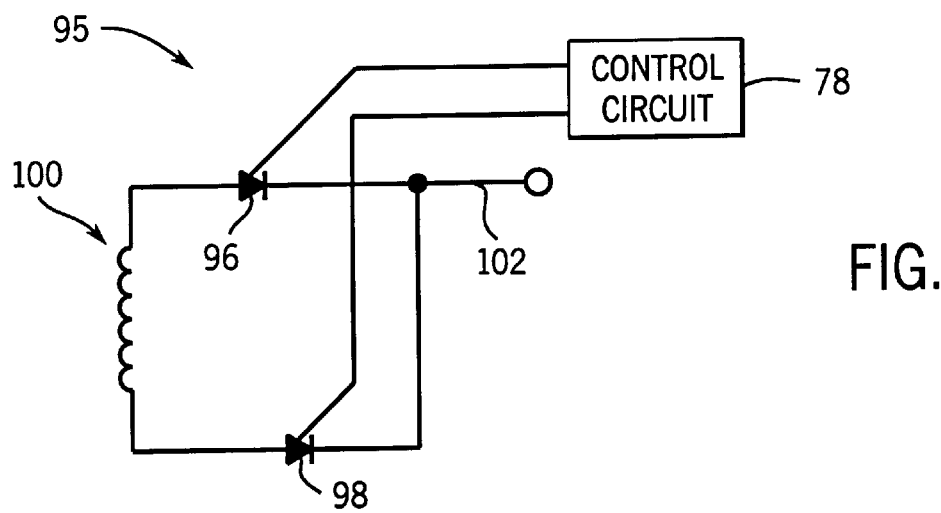
FIG. 5 is a circuit diagram showing another alternative embodiment of the switch of FIG. 2.

Another alternative embodiment of switch 80 is shown in FIG. 5. In this embodiment, a switch 95 includes a first SCR 96 and a second SCR 98, both controlled by control circuit 78. An AC source 100, shown in this embodiment as a winding, provides a first half cycle of power to first SCR 96 during which control circuit 78 fires first SCR 96 at a multiple of the line frequency, and provides a second half cycle of power to second SCR 98 during which control circuit 78 fires second SCR 98 at the same multiple of the line frequency. With each SCR 96, 98 firing at, for example, one-half the line frequency (e.g., 30 Hertz or 25 Hertz), the pulsed power signal provided at terminal 102 at the line frequency (e.g., 60 Hertz, or 50 Hertz). Naturally, other configurations and firing frequencies are contemplated. AC source 100 may be an extension winding, a separate winding, a higher tap on first secondary winding 66, a second transformer, or another AC source.

Figure 6:
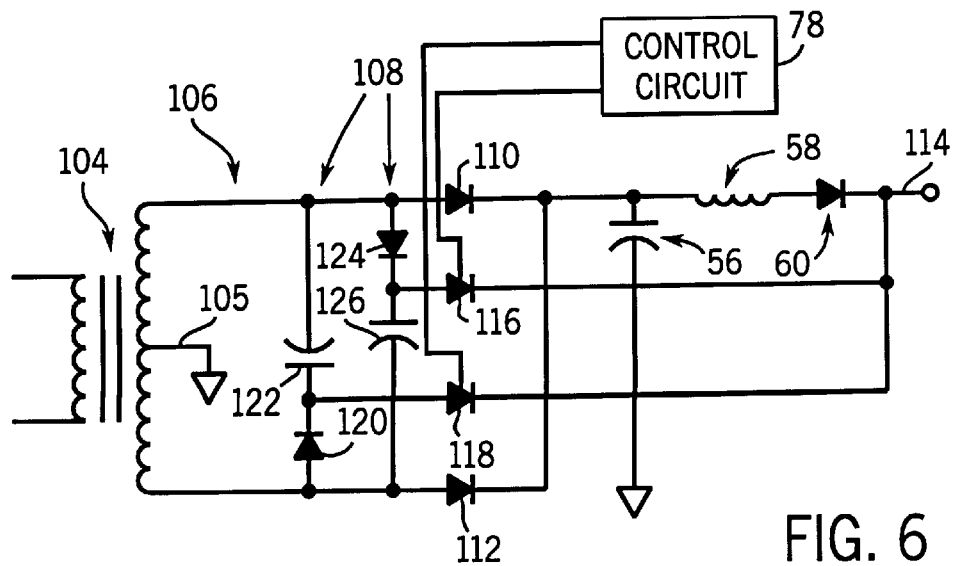
FIG. 6 is a circuit diagram showing an alternative to the circuit of FIG. 2.

Yet another embodiment of the present invention is disclosed in FIG. 6. In this embodiment, rectifier circuit 54 and controlled switch 62 are combined in one circuit 106. Circuit 106 includes an AC source, in this case comprising a center tap transformer 104 having a work terminal 105 and a voltage doubler 108. Rectifying diodes 110, 112 full-wave rectify the line frequency power signal from the AC source and provide the rectified signal as a main power signal at terminal 114 (through capacitor 56, inductor 58 and diode 60 as described with reference to FIG. 2). Switches 116, 118 are controlled by control circuit 78 to transmit current in response to control signals from control circuit 78. Voltage doubler 108 comprises a first diode 120 coupled at its anode to the first terminal of the AC source and at its cathode to the positive terminal of a first capacitor 122 (e.g., an electrolytic capacitor). Capacitor 122 is coupled at its negative terminal to the second terminal of the AC source. Switch 118 couples the cathode of diode 120 to terminal 114. In similar but opposite configuration, a second diode 124 is coupled at its anode to the second terminal of the AC source and at its cathode to the positive terminal of a second capacitor 126 (e.g., an electrolytic capacitor). Capacitor 126 is coupled at its negative terminal to the first terminal of the AC source. Switch 116 couples the cathode of diode 124 to terminal 114.

In operation, voltage doubler 108 will store a charge that can subsequently be discharged by operation of switches 116, 118. During the positive half cycle of line frequency power at the AC source, diode 120 is reverse biased and does not conduct current while diode 124 is forward biased and conducts current to charge capacitor 126 such that the voltage across capacitor 126 is approximately equal to the peak voltage of the line frequency power (e.g., 60 Volts). Switches 116, 118 remain off, as controlled by control circuit 78. Rectifier 110 conducts current to provide the first half cycle of the main welding power, which is subsequently smoothed and conditioned by capacitor 56 and inductor 58. During the negative half cycle of the line frequency power at the AC source, diode 120 is now forward biased and conducts current to charge capacitor 122 such that the voltage across capacitor 122 is approximately equal to the peak voltage of the line frequency power. Also, during the negative half cycle a first voltage at the negative side of capacitor 126 is high relative to common 105, providing a voltage at the positive terminal of capacitor 126 equal to the negative voltage plus the voltage previously stored in capacitor 126. Thereby a voltage greater than the main welding voltage is achieved. Also during the negative half cycle of the line frequency power at the AC source, rectifier 112 conducts current to provide the second half cycle of the main welding power, which is subsequently smoothed and conditioned by capacitor 56 and inductor 58 (see FIG. 2).

Subsequent to this charge build-up step, control circuit 78 fires switch 118 to discharge capacitor 122. During the next half cycle, control circuit 78 fires switch 116 to discharge capacitor 126. Thus, control circuit 78 fires switches 116, 118 to provide a pulse at a fixed frequency, viz., the line frequency. Alternatively, diode 120, capacitor 122 and switch 118 could be removed to provide a pulse at one-half the line frequency. Control circuit 78 may also fire switch 116 or switches 116, 118 at other frequencies. Control circuit 78 preferably fires switches 116, 118 at a fixed pulse width (e.g., 1.7 milliseconds).

While the DC current of the pulsed welding power in the various embodiments may be any of a variety of amperages, preferably this DC current is higher than the transition current of the filler wire comprising electrode 14. Several factors affect the transition current. These include the electrode diameter, the electrode chemistry (alloy) and the electrode "stick-out". Electrode "stick-out" refers to the distance that electrode 14 extends from a nozzle of gun 12. For example, the transition current of 0.035 inch aluminum wire with 0.25 inch stick-out is approximately 200–205 Amps. Accordingly, providing a pulse having a peak amperage of 250 Amps is sufficient to exceed the transition current of the 0.035 inch wire, thus creating an axially-stable arc. Preferably, the pulsed welding power has a peak amperage of 250 Amps in one embodiment of the present invention. However, other configurations are contemplated for welding applications of various amperages, workpiece sizes and types, etc.

The pulse width of 1.75 milliseconds is selected to preferably remove one ball of molten filler wire from the consumable electrode 14 at a time. If the pulse width is too narrow for the filler wire, no droplets will be removed, but if the pulse width is too wide, more than one droplet will be removed. Neither situation is a desirable characteristic for pulsed spray welding.

Referring now to FIGS. 7A–7F, waveform diagrams for various settings of voltage selector 22 are shown. In this embodiment, circuit 50 is configured as shown in FIG. 2 above, viz., transformer 52 is a multi-tap transformer to allow the operator to select, via voltage selector 22, a desired voltage by adjusting which of taps 70 is coupled to line 72. The multi-tap transformer may be replaced by other configurations of switches, diodes, etc. for performing the same function.

Figure 7A:
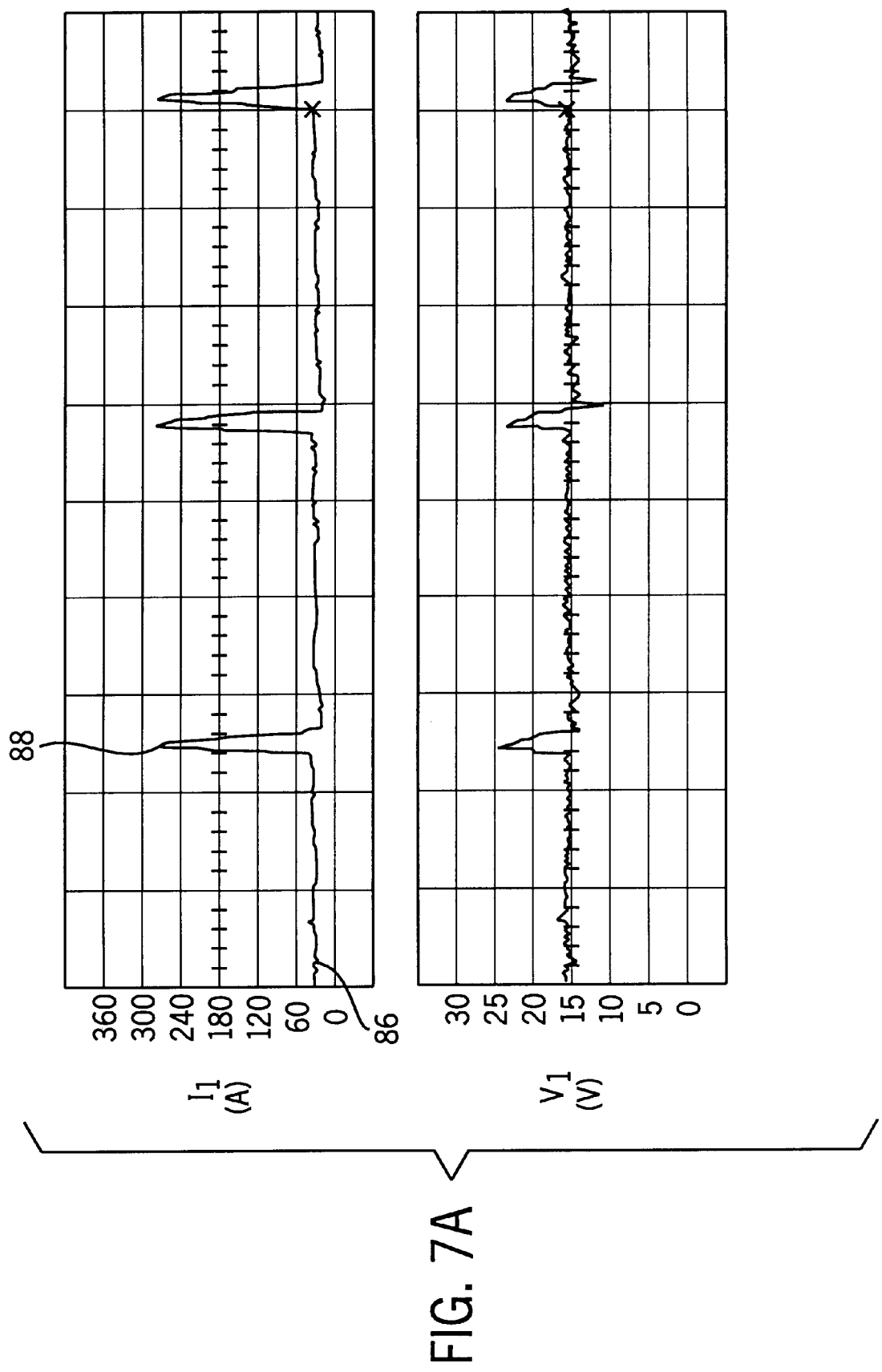
FIGS. 7A–7F are waveform diagrams showing the output current and output voltage for various settings of a multi-tap transformer according to the embodiment shown in FIG. 2.

In FIG. 7A, the waveforms were taken while welding with 0.035 inch diameter 4043 aluminum on an aluminum workpiece having a thickness of 1 millimeter. $I_1$ represents the pulsed welding power when switch 84 is set to tap 1 of the plurality of taps 70. $I_1$ includes a main welding power component 86 at approximately 30 Amps DC and a pulsed welding power component 88 pulsing at a frequency of approximately 30 Hertz and having a peak amperage, when combined with main welding power component 86 of approximately 280 Amps. The corresponding voltage waveform has a DC component of approximately 16 Volts DC and a peak voltage of approximately 25 Volts DC at the same frequency as pulsed welding power component 88.

Figure 7B:
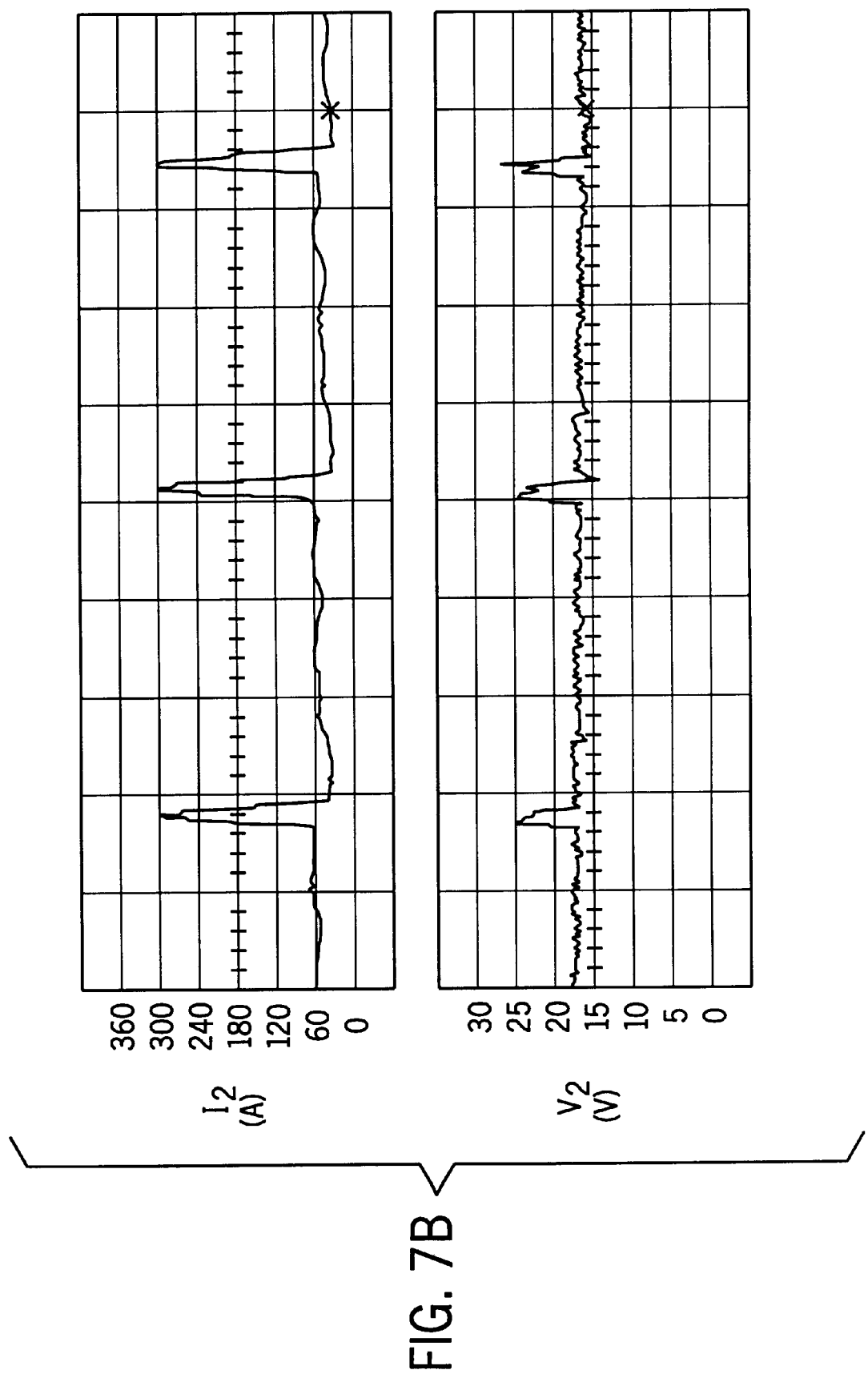

In FIG. 7B, the waveforms were taken while welding with 0.035 inch diameter 4043 aluminum on an aluminum workpiece having a thickness of 2 millimeters. $I_2$ represents the pulsed welding power when switch 84 is set to tap 2 of the plurality of taps 70. When the operator manipulates voltage selector 22 to adjust switch 84 to the second tap, $I_2$ is the resultant waveform. This increases the arc length of the resulting welding arc, which the operator recognizes as an undesirable situation. Therefore, the operator manipulates wire feed speed selector 24 to increase the wire feed speed, which decreases the arc length, and increases the welding current primarily by increasing the main welding current, not the pulsed welding current. $I_2$ includes a main welding power component 86 at approximately 60 Amps DC and a pulsed welding power component 88 pulsing at a frequency of approximately 30 Hertz and having a peak amperage, when combined with main welding power component 86 of approximately 300 Amps. The corresponding voltage waveform has a DC component of approximately 17 Volts DC and a peak voltage of approximately 25 Volts DC at the same frequency as pulsed welding power component 88.

Figure 7C:
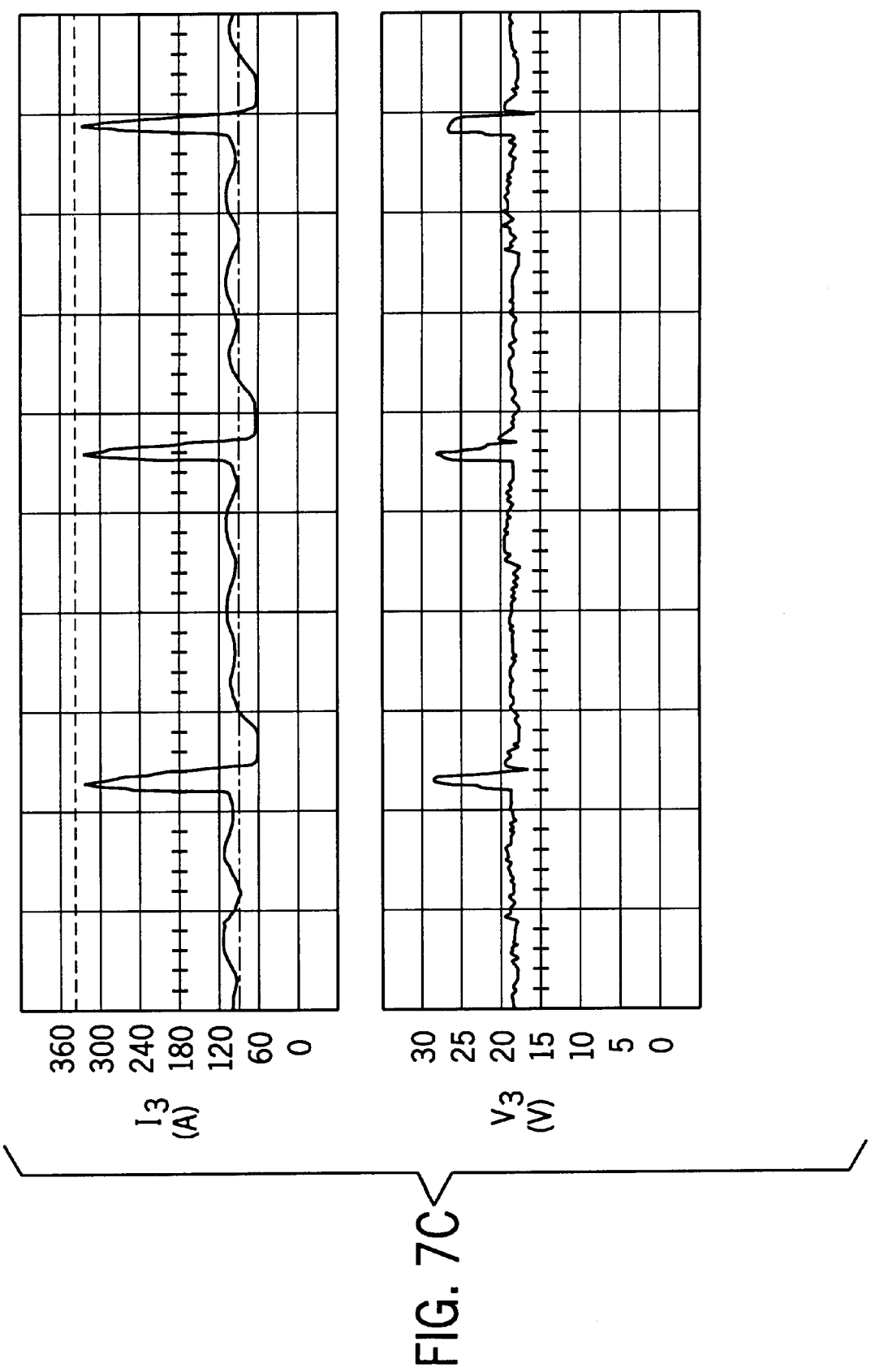
Figure 7D:
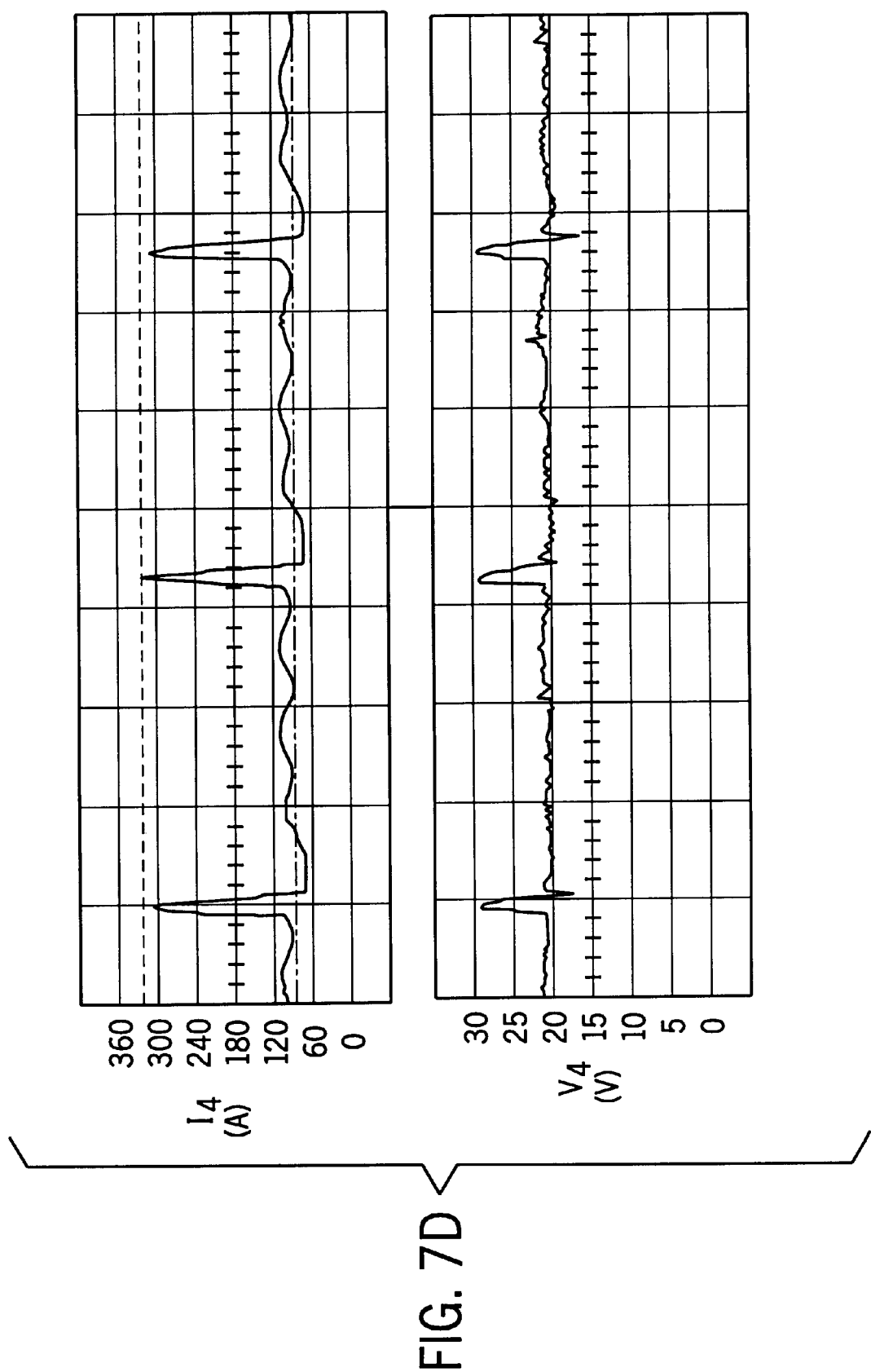
Figure 7E:
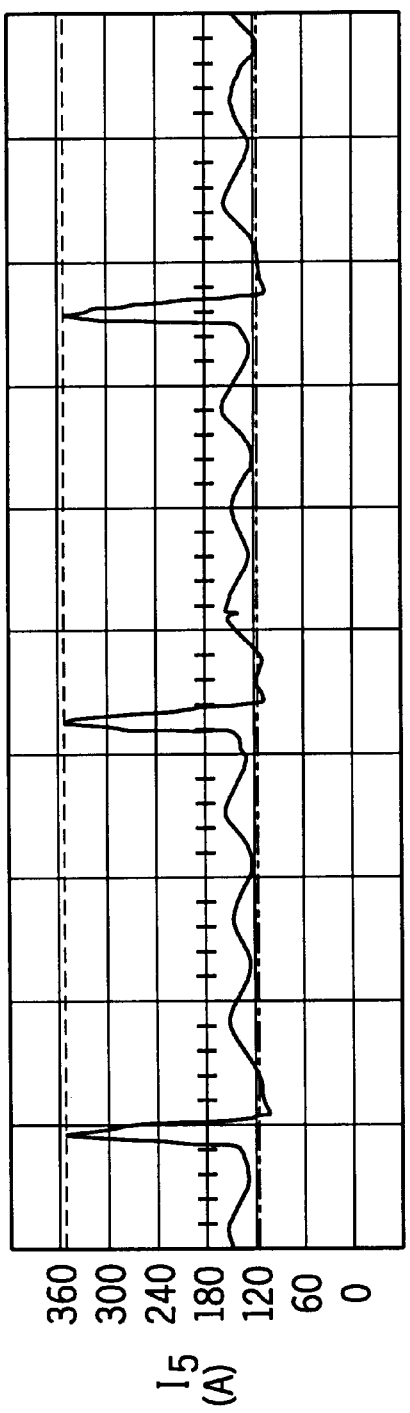
Figure 7E:
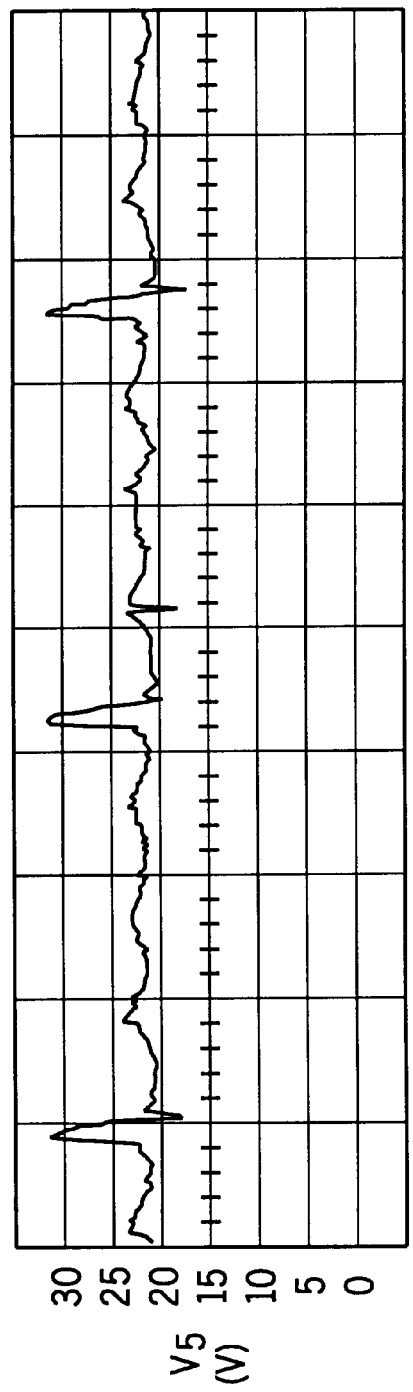
Figure 7F:
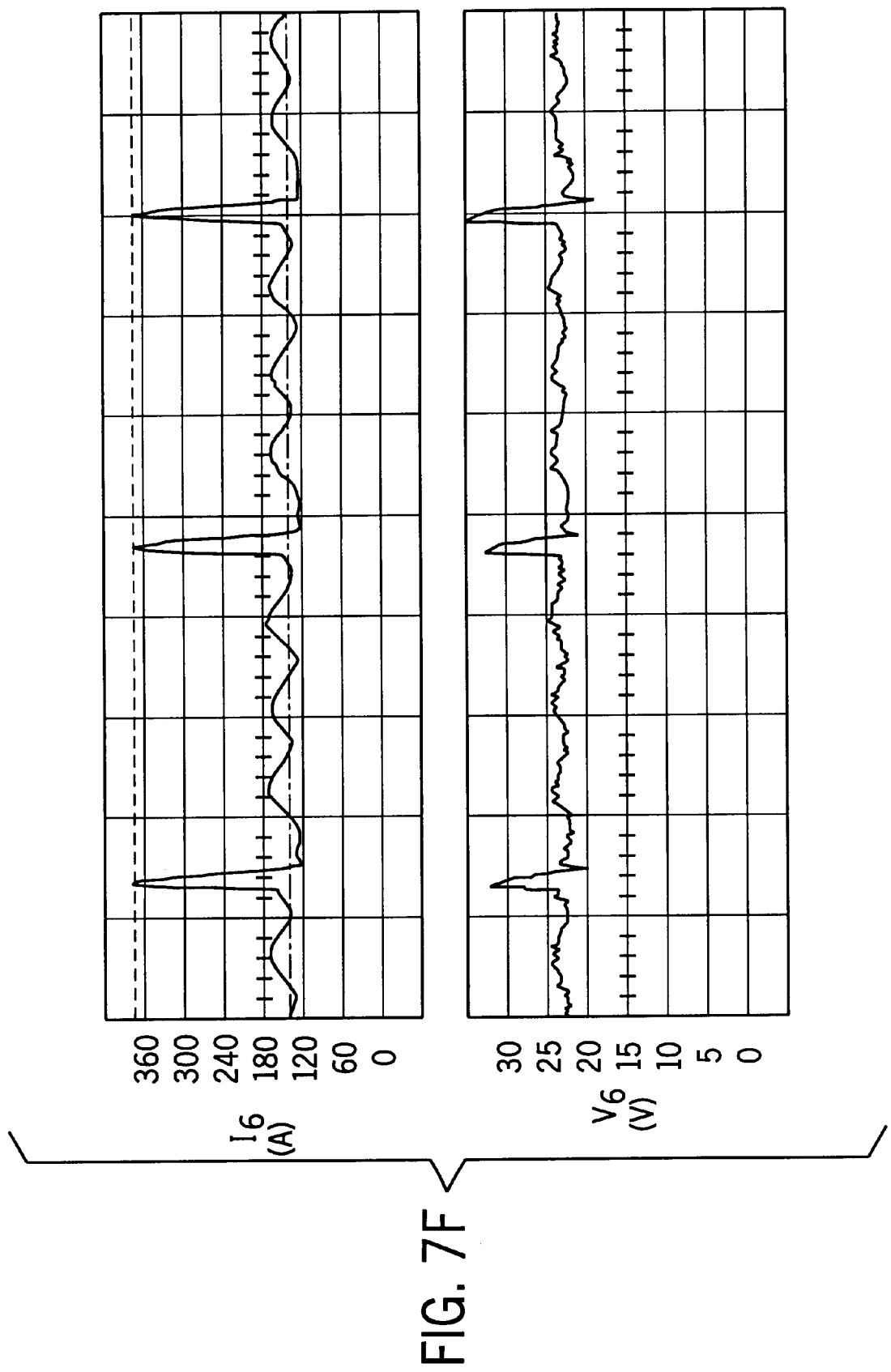

FIGS. 7C–7F similarly show waveforms for similar increases in the voltage and wire feed speed. In FIG. 7C, the waveforms were taken while welding with 0.035 inch diameter 4043 aluminum on an aluminum workpiece having a thickness of 3 millimeters. The welding power has a background current of approximately 80 ADC, a pulse peak of approximately 320 ADC, a voltage of approximately 18 VDC and a voltage peak of approximately 27 VDC. Also, the background current is showing a slight ripple. In FIG. 7D, the waveforms were taken while welding with 0.035 inch diameter 4043 aluminum on an aluminum workpiece having a thickness of 1/8 inch. The welding power has a background current of approximately 90 ADC, a pulse peak of approximately 320 ADC, a voltage of approximately 20 VDC and a voltage peak of approximately 29 VDC. In FIG. 7E, the waveforms were taken while welding with 0.035 inch diameter 4043 aluminum on an aluminum workpiece having a thickness of 3/16 inch. The welding power has a background current of approximately 130 ADC, a pulse peak of approximately 350 ADC, a voltage of approximately 22 VDC and a voltage peak of approximately 32 VDC. In FIG. 7F, the waveforms were taken while welding with 0.035 inch diameter 4043 aluminum on an aluminum workpiece having a thickness of 1/4 inch. The welding power has a background current of approximately 150 ADC, a pulse peak of approximately 360 ADC, a voltage of approximately 23 VDC and a voltage peak of approximately 33 VDC. One feature disclosed in FIGS. 7A–7F is that, even when the operator has selected the pulse mode of operation, when voltage selector 22 is increased to taps 4, 5 or 6 (e.g., FIGS. 7D–F), the welding current transitions from a pulsed mode to a continuous spray mode, as indicated to the operator by the ceasing of the pulsing sound (e.g., the "purr") characteristic of pulsed welding power.

Another feature of the present invention, in particular as embodied in FIGS. 2 and 7A–7F, is that the main welding power has a constant voltage characteristic and the pulsed welding power has characteristics of both constant voltage and constant current. Briefly, constant current ("CC") and constant voltage ("CV") characteristics describe how a welding power supply reacts in response to a change in arc length. A constant current (also called a "drooper") welding characteristic usually requires a voltage following controller coupled to the wire feed mechanism. If the arc length increases, the controller increases the wire feed speed to shorten the arc. If the arc length decreases, the controller decreases the wire feed speed to lengthen the arc. A constant voltage welding characteristic does not require a voltage following controller because current increases in response to a decrease in arc length, which increases the wire melt rate, subsequently causing the arc length to increase. In response to an increase in arc length, current decreases which decreases the wire melt rate, subsequently causing the arc length to decrease. Reference is made to the Welding Handbook, Volume 2: Welding Processes, Eighth Edition, pp. 3–4, 12–14 (American Welding Society 1991) for further definition of the terms constant current and constant voltage.

One aspect of the present invention is that the circuit providing the pulsed welding power (e.g., switch 80) has characteristics of both constant current and constant voltage while the circuit providing the main welding power has a constant voltage characteristic. The constant voltage characteristic of the pulsed welding power is due to the fact that switch 80 is coupled directly to second secondary winding 68 of transformer 52. The constant current characteristic of the pulsed welding power is due to the high impedance of transformer 52. This impedance is a result of several factors in the exemplary embodiment of FIGS. 2 and 7A–7F including the small size of the transformer, which increases leakage inductance, the small gage of the extension winding which increases resistance, and the coefficient of coupling of second secondary winding 68 to primary winding 64. Even in the alternative embodiment in which the gage of the extension winding is not smaller than that of first secondary winding 66, transformer 52 includes sufficient impedance to give the pulsed welding power a constant current characteristic. The constant current characteristic of the pulsed welding power can be seen in the waveforms of FIG. 7, though an alternative embodiment of the circuit of FIG. 2 in which the pulsed welding power was solely constant voltage could be configured to yield waveforms similar to those in FIG. 7.

Accordingly, it can be seen that a welding power supply can be provided that allows pulsed spray welding in addition to short circuit welding in MIG welders, while reducing the overall costs significantly by using simple, inexpensive components, and further reducing the complexity to the operator of the power supply. No pulsing system has previously been available in this price range. Furthermore, the arc welder of the present invention has advantages over higher power 60 or 120 Hertz power supplies in that a lower current can be provided in a simpler, single-phase power supply. Additionally, a separate circuit is provided for the addition of pulsed spray welding, as opposed to some prior art devices which utilize complex and expensive circuitry (e.g., multiple transformers) to integrate the pulse circuit with the main power circuit.

While the embodiments illustrated in the figures and described above are presently preferred, it should be understood that these embodiments are offered by way of example only. For example, as an alternative embodiment, control circuit 78, switch 80 and a transformer can be part of an add-on circuit for an existing MIG welding power supply for providing pulsed welding capability to the welding power supply. Many alternative embodiments of the present invention are contemplated based on the novel characteristics of the present welding device. The invention is not limited to a particular embodiment, but extends to various modifications that nevertheless fall within the scope of the appended claims.

What is claimed is:

1. An arc welding machine for providing a continuous feed electrode to a weld site, comprising:

an operator control having at least two positions; and a line frequency transformer having a primary winding, a first secondary winding to provide a first welding power having a first voltage at a welding power output terminal, wherein the first welding power is sufficient for a first welding operation when the operator control is in a first position, and a second secondary winding to provide a second welding power having a second higher voltage at an input terminal of a switch, said switch being controlled to provide a pulsed power at the welding power output terminal.

2. The arc welding machine of claim 1, wherein the switch provides the pulsed power having a pulse duration of approximately 1.75 milliseconds.

3. The arc welding machine of claim 1, wherein the second secondary winding is an extension winding having a thinner gage wire than that of the first secondary winding.

4. The arc welding machine of claim 3, wherein the line frequency transformer is configured for single phase power.

5. The arc welding machine of claim 1, wherein the second secondary winding is a separate winding.

6. The arc welding machine of claim 1, wherein the combined welding power and pulsed power provide a pulsed spray welding power suitable for welding aluminum having a thickness of approximately one-eighth inch or less when the operator control is in a second position.

7. The arc welding machine of claim 1, wherein the switch provides a pulsed power having a fixed frequency of approximately 30 Hertz.

8. The arc welding machine of claim 1, wherein the second secondary winding provides the second welding power to only one switch.

9. The arc welding machine of claim 1, further comprising a rectifier circuit and a capacitor coupled between the first secondary winding and the welding power output terminal, further comprising an inductor and a second switch coupled in series between the capacitor and the welding power output terminal, wherein the second switch prevents the pulsed power from entering the rectifier circuit.

10. The arc welding machine of claim 1, wherein the second secondary winding is part of a multi-tap transformer, wherein the operator control is coupled to the multi-tap transformer and is configured to select one of a plurality of positions on the multi-tap transformer.

11. The arc welding machine of claim 1, wherein the first welding operation is a continuous spray welding operation.

12. An arc welding machine for providing a continuous feed electrode to a weld site, comprising:
   line frequency transformer means including first and second secondary windings for receiving a line frequency power and for providing first and second welding powers, the second welding power having a higher voltage than the first welding power;
   first means for receiving the first welding power, for providing a welding power for a non-pulsed welding operation at a welding power output in a first mode, and for providing a background welding power for a pulsed welding operation at the welding power output in a second mode; and
   second means for receiving the second welding power and for providing a pulsed welding power at the welding power output.

13. The arc welding machine of claim 12, wherein the second secondary winding is an extension winding.

14. The arc welding machine of claim 13, wherein the extension winding has a thinner gauge material than that of the first secondary winding.

15. The arc welding machine of claim 12, wherein the second means includes only one switch.

16. The arc welding machine of claim 12, wherein the first secondary winding extends from a first line to a first tap and the second secondary winding extends from the first line to a second tap.

17. The arc welding machine of claim 12, wherein the first secondary winding includes a plurality of taps, the first means receiving the first welding power from one of the plurality of taps based on an operator input device.

18. The arc welding machine of claim 12, wherein the second means provides the pulsed power having a fixed pulse frequency.

19. The arc welding machine of claim 18, wherein the pulse frequency is a multiple of the line frequency.

20. The arc welding machine of claim 12, wherein the second means provides the pulsed power having a fixed pulse width.

21. The arc welding machine of claim 20, wherein the fixed pulsed width is approximately 1.75 milliseconds.

22. An arc welding machine for providing a continuous feed electrode to a weld site, comprising:
   a power circuit to provide a pulsed welding power to the weld site; and
   a control circuit to provide control signals to the power circuit to control characteristics of the pulsed welding power; and
   operator controls configured to provide operator input signals to at least one of the power circuit and the control circuit, wherein the control circuit causes the power circuit to output a pulsed welding power having a fixed frequency and fixed pulse width irrespective of the operator input signals received from the operator controls, whereby the fixed frequency and fixed pulse width are substantially free of operator adjustment.

23. The arc welding machine of claim 22, the pulsed welding power having a main welding current and a pulsed welding current, wherein the operator controls include a background voltage selector and a wire feed speed selector, both coupled to the power circuit, the background voltage selector and wire feed speed selector providing operator adjustability of the main welding current component of the pulsed welding power.

24. The arc welding machine of claim 22, the pulsed welding power having a main welding current and a pulsed welding current, wherein the power circuit comprises a first transformer to provide the main welding current and a second transformer to provide the pulsed welding current.

25. The arc welding machine of claim 22, wherein the power circuit comprises a center tap transformer.

26. The arc welding machine of claim 25, wherein the power circuit comprises a voltage doubler coupled to the center tap transformer and a rectifier circuit coupled to the center tap transformer.

27. The arc welding machine of claim 22, wherein the fixed frequency is approximately 30 Hertz.

28. The arc welding machine of claim 22, wherein the fixed pulse width is approximately 1.75 milliseconds.

29. The arc welding machine of claim 22, the power circuit to adjust the pulse width based on a line frequency power provided to the power circuit to provide a pulse having a constant current.

30. An arc welding machine for providing a continuous feed filler wire to a weld site, comprising:
   a single-phase AC power source to provide a power signal;
   a rectifier circuit coupled to the AC power source to substantially rectify the power signal and to provide the rectified power signal with a constant voltage characteristic to the weld site; and
   a switch coupled to the AC power source to provide a pulsed power signal with a constant current characteristic to the weld site, wherein the switch provides the constant current characteristic in an open loop configuration, without the use of a feedback circuit.

31. The arc welding machine of claim 30, the pulsed power signal having a fixed frequency.

32. The arc welding machine of claim 31, the pulsed power signal having a frequency of approximately a multiple of the line frequency.

33. The arc welding machine of claim 30, the pulsed power signal having a fixed pulse width.

34. The arc welding machine of claim 30, the pulsed power signal having a peak amperage greater than the amperage of the rectified power signal.

35. The arc welding machine of claim 30, the AC power source including a first secondary winding and a second secondary winding, the second secondary winding having a smaller gauge wire than that of the first secondary winding, the rectifier circuit coupled to the AC power source at the first secondary winding and the switch coupled to the AC power source at the second secondary winding.

36. The arc welding machine of claim 30, the AC power source including a multi-tap transformer to provide a power signal at one of a plurality of voltages, said one voltage being selected by an operator-adjustable selector.

37. A power circuit for providing pulsed welding capability to a welding power supply, the welding power supply of the type having a line frequency transformer to provide a first welding power at a welding power output terminal, the power circuit comprising:

a transformer to provide a second welding power;

a switch coupled to the transformer to receive the second welding power; and a control circuit coupled to the switch to control the switch to provide a pulsed welding power at the welding power output terminal, the pulsed welding power having a fixed frequency and fixed pulse width which are fixed irrespective of operator input.

38. The power circuit of claim 37, wherein the fixed frequency is approximately 30 Hertz and the fixed pulse width is approximately 1.75 milliseconds.

39. The power circuit of claim 37, wherein the fixed frequency is a multiple of the line frequency.

40. The power circuit of claim 37, the pulsed power having a constant current characteristic.

41. The power circuit of claim 37, wherein the second welding power has a higher voltage than that of the first welding power.

42. The power circuit of claim 37, wherein the combined first welding power and pulsed welding power provide a pulsed spray welding power suitable for welding aluminum having a thickness of approximately one-eighth inch or less.

43. The power circuit of claim 37, the control circuit to adjust the pulse width based on a line frequency power to provide a pulse having a constant current.

44. An arc welding machine for providing a pulsed welding arc and at least one non-pulsed welding arc, comprising:

a first power circuit to provide a main welding power to a weld site;

a second power circuit to provide a pulsed welding power; and operator controls configured to provide operator input signals to the first and second power circuit to control the operation thereof, wherein the pulsed welding power has a pulse width and pulse frequency that are fixed irrespective of operator control, wherein the operator may select between a pulsed welding operation and a non-pulsed welding operation.

45. The arc welding machine of claim 44, wherein the non-pulsed welding operation is a continuous spray welding operation.

46. The arc welding machine of claim 45, wherein the operator may further select between a continuous spray welding operation and a short circuit welding operation.

* * * * *